US012781146B2

(12) United States Patent
Wildfire et al.

(10) Patent No.: US 12,781,146 B2
(45) Date of Patent: Nov. 3, 2026

(54) METHODS AND APPARATUSES FOR PRODUCING HYDROGEN

(71) Applicant: Cecilia Materials Inc., Newark, NJ (US)

(72) Inventors: Christina Wildfire, Fairmont, WV (US); Pranjali Muley, Morgantown, WV (US); Ashraf Abedin, Morgantown, WV (US); Kathryn Carpenter, Brooklyn, NY (US)

(73) Assignees: Cecilia Materials Inc., Newark, NJ (US); U.S. Department of Energy, Morgantown, WV (US)

( * ) Notice: Subject to any disclaimer, the term of this patent is extended or adjusted under 35 U.S.C. 154(b) by 729 days.

(21) Appl. No.: 18/104,116

(22) Filed: Jan. 31, 2023

(65) Prior Publication Data

US 2023/0242825 A1 Aug. 3, 2023

Related U.S. Application Data

(60) Provisional application No. 63/413,921, filed on Oct. 6, 2022, provisional application No. 63/305,515, filed on Feb. 1, 2022.

(51) Int. Cl.

*C10J 3/48* (2006.01)
*B01J 8/18* (2006.01)

(Continued)

(52) U.S. Cl.

CPC ............. *C10J 3/482* (2013.01); *B01J 8/1809* (2013.01); *B01J 8/1818* (2013.01); *B01J 8/1836* (2013.01);

(Continued)

(58) Field of Classification Search

CPC ... C10J 3/482; C10J 3/463; C10J 3/721; C10J 2300/0946; C10J 2300/0986;

(Continued)

(56) References Cited

U.S. PATENT DOCUMENTS

| | | | | |
|---|---|---|---|---|
| 3,304,249 | A * | 2/1967 | Katz | B01J 8/42 34/364 |
| 4,435,374 | A | 3/1984 | Helm, Jr. | |
| 5,374,413 | A | 12/1994 | Kim et al. | |
| 6,184,427 | B1 | 2/2001 | Klepfer et al. | |
| 2004/0223907 | A1 | 11/2004 | Pez et al. | |
| 2007/0149625 | A1 | 6/2007 | Lark et al. | |

(Continued)

FOREIGN PATENT DOCUMENTS

| | | |
|---|---|---|
| CN | 1754966 | 4/2006 |
| CN | 104006631 | 9/2015 |

(Continued)

OTHER PUBLICATIONS

Abedin, A., et al.,. "Microwave-assisted co-gasification of mixed plastics and corn stover: A synergistic 1-20 approach to produce clean hydrogen", in Energy Conversion and Management, vol. 280, Mar. 2023, available online at: https://www.sciencedirect.com/science/article/abs/pii/S0196890423001206.

(Continued)

*Primary Examiner* — Anthony J Zimmer
*Assistant Examiner* — Syed T Iqbal
(74) *Attorney, Agent, or Firm* — Polsinelli PC; Gregory P. Durbin

(57) ABSTRACT

The present disclosure provides methods and apparatuses of producing hydrogen. The methods comprise: (a) contacting a plastic with a catalyst and a gas feed; and (b) applying a microwave at a first temperature. The apparatuses comprise: a reactor for mixing plastic with a catalyst to form a mixture; an inlet for introducing a gas feed; a microwave generator; an optional temperature sensor; and an outlet configured to exhaust the product hydrogen formed in the reactor.

20 Claims, 7 Drawing Sheets

(51) Int. Cl.

| | |
|---|---|
| ***B01J 8/42*** | (2006.01) |
| ***C01B 3/02*** | (2026.01) |
| ***C10J 3/46*** | (2006.01) |
| ***C10J 3/72*** | (2006.01) |

(52) U.S. Cl.

CPC *B01J 8/42* (2013.01); *C01B 3/02* (2013.01); *C10J 3/463* (2013.01); *C10J 3/721* (2013.01); *B01J 2208/00061* (2013.01); *B01J 2208/00442* (2013.01); *C10J 2300/0946* (2013.01); *C10J 2300/0986* (2013.01); *C10J 2300/123* (2013.01)

(58) Field of Classification Search

CPC .......................... C10J 2300/123; C10J 3/723; B01J 8/1809; B01J 8/1818; B01J 8/1836; B01J 8/42; B01J 2208/00061; B01J 2208/00442; B01J 7/00; B01J 19/126; C01B 3/02; C01B 3/22; C01B 3/26; Y02E 60/36

See application file for complete search history.

(56) References Cited

U.S. PATENT DOCUMENTS

| | | | | |
|---|---|---|---|---|
| 2009/0272653 | A1 | 11/2009 | Beech et al. | |
| 2012/0138601 | A1 | 6/2012 | Hemmings et al. | |
| 2014/0163120 | A1 | 6/2014 | Kyle | |
| 2017/0327435 | A1 * | 11/2017 | Koma | B01J 23/464 |
| 2021/0214517 | A1 * | 7/2021 | Xiao | C01B 3/02 |
| 2021/0284920 | A1 | 9/2021 | Chalifoux et al. | |
| 2021/0347960 | A1 | 11/2021 | Hu et al. | |
| 2022/0153577 | A1 | 5/2022 | Soodjinda et al. | |

FOREIGN PATENT DOCUMENTS

| | | | | |
|---|---|---|---|---|
| CN | 105925289 A | 9/2016 | | |
| CN | 113122336 | 7/2021 | | |
| WO | WO 2016/203264 | 12/2016 | | |
| WO | WO-2016203264 A1 * | 12/2016 | | B01J 8/12 |
| WO | 2021195566 A1 | 9/2021 | | |

OTHER PUBLICATIONS

Cao, Q., et al., "Microwave-Initiated MAX Ti3ALC2-catalyzed Upcycling of Polyolefin Plastic Wastes: Selective conversion to hydrogen and carbon nanofibers for sodium-ion battery", In Applied Catalysis B: Environmental, vol. 318, Dec. 2022, pp. 121828.

Cui, Y., et al., "Microwave-Assisted Fluidized Bed Reactor Pyrolysis of Polypropylene Plastic for Pyrolysis Gas Production Towards a Sustainable Development", in Applied Energy, vol. 342, Jul. 2023, pp. 1-10.

Fivga, A., et al., "Pyrolysis of Plastic Waste for Production of Heavy Fuel Substitute: A techno-economic assessment", In Energy, vol. 149, Apr. 2018, pp. 865-874.

Fu, W., et al., "Experimental Microwave-Assisted Air Gasification of BioMass in a Fluidized Bed Reactor", in Bioresource Technology, vol. 369, Feb. 2023, pp. 1-8.

Internation Search Report and Written Opinion dated Mar. 17, 2023 in International Patent Application PCT/US23/12026, pp. 1-85.

Jie, X., et al., "Microwave-Initiated Catalytic Deconstruction of Plastic Waste into Hydrogen and High-Value Carbons", in Nature Catalysis, vol. 3, Oct. 2020, pp. 902-912.

Nanda, S., et al., "Therochemical Conversion of Plastic Waste to Fuels: a review", in Environmental Chemistry Letters, vol. 19, Sep. 2020, pp. 123-148.

Ramzan, F., et al., "Single Step Microwaves Assisted Catalytic Conversion of Plastic Waste into Valuable Fuel and Carbon Nanotubes", In Thermochimica Acta, vol. 715, Sep. 2022, pp. 179294.

Solis, M., et al., "Technologies for Chemical Recycling of Household Plastics—A technical review and TRL assessment", In Waste Management, vol. 105, Mar. 2020, pp. 128-138.

Yao, L., et al., "Microwave-Assisted Decomposition of Waste Plastic over Fe/FeAl204 to Produce Hydrogen and Carbon Nanotubes", In Journal of Analytical and Applied Pyrolysis, vol. 165, Aug. 2022, pp. 105577.

Zhang, P., et al., "High-Efficient Microwave Plasma Discharging Initiated Conversion of Waste Plastics into Hydrogen and Carbon Nanotubes", In Energy Conversion and Management, vol. 268, Sep. 2022, pp. 116017.

Adam, M. et al., Microwave Fluidized Bed for Biomass Pyrolysis. Part I: Process Design, Society of Chemical Industry and John Wiley & Sons, Biofuels, Bioprod. Bioref, 8:1-12, Apr. 3, 2017 (12 Pages).

Salakhi, M. et al., A Particle-Scale Study Showing Microwave Energy Can Effectively Decarbonize Process Heat in Fluidization Industry, iScience, 28:1-21, Feb. 21, 2025 (21 Pages).

Soni, V. K. et al., "Thermochemical Recycling of Waste Plastics by Pyrolysis: A Review," Energy Fuels, 35:12763-12808, Aug. 2, 2021 (46 Pages).

* cited by examiner

METHODS AND APPARATUSES FOR PRODUCING HYDROGEN

1. GOVERNMENT RIGHTS

This invention was made under a CRADA AGMT-1146 between Cecilia Energy, LLC and the National Energy Technology Laboratory, owned and operated by the U.S. Department of Energy. The Government has certain rights in this invention.

2. BACKGROUND OF THE DISCLOSURE

Recent times have exacerbated another pandemic we are in, waste plastic pollution. This pandemic is one that is set to increase exponentially over time unless there is a radical shift in the definition of recycling. The worldwide production of human-made plastic is currently more than 330 million tons per year, with production of plastic waste anticipated to increase at an estimated 3.9% per year. (Fivga, A. & Dimitriou, I. Energy 149, 865-874 2018.) Given the rate of current production and use of plastic, it is estimated that approximately 12 trillion tons of plastic waste will require disposal by 2050. (Geyer, R., Jambeck, J. R. & Law, K. L. Sci. Adv. 3, 2017.)

Currently, the vast majority of plastics are landfilled or incinerated with only a small proportion recycled. (Chen, X., Wang, Y. & Zhang, L. Chem Sus Chem 14, 4137-4151 2021.) Landfilling is unsustainable at the current rate of plastic waste production, and also fails to extract energy or useful products from this feedstock. Incineration is a fairly inefficient method of energy extraction, and it can cause pollution and produce carbon dioxide, thereby exacerbating climate change.

Plastic recycling is only available for some thermoplastics, primarily the polyolefins polyethylene and polypropylene. (Chen, X., Wang, Y. & Zhang, L. Chem Sus Chem 14, 4137-4151 2021; Solis, M. & Silveira, S. Waste Manag. 105, 128-138, 2020.) However, thermoplastic recycling leads to a reduction in strength and resiliency, resulting in a down-cycling of products that cost more to produce than virgin plastic. (Ibid.)

Due to limitations in current recycling methods, researchers have turned to plastic upcycling technologies. Plastic upcycling strategies largely fall into one of two categories:

(1) thermochemical degradation to produce gases and/or petroleum-like oils, or (2) degradation of the polymer to generate monomers, which then undergo polymerization to produce plastics of similar mechanical and structural properties as virgin plastics. Most thermochemical degradation methods are classified as either pyrolysis or gasification technologies. (Nanda, S. & Berruti, F. Environ. Chem. Lett. 2020 191 19, 123-148 2020.)

Pyrolysis techniques generally have higher conversion efficiencies and lower costs compared to gasification, but the choice largely comes down to what the desired products are. Hydrocarbons are produced in both pyrolysis and gasification technologies and can then be used to synthesize a wide range of desirable chemicals and fuels.

Microwave (MW)-assisted thermo-catalytic decomposition of plastics is much more energy efficient than current thermal and thermo-catalytic technologies. To date, however, MW-assisted thermo-catalytic decomposition has been used in the production of pyrolytic oils.

MW-assisted thermo-catalysis has been applied to produce hydrogen and carbon from plastics, achieving ~90% yield of $H_2$. (Jie, X. et al., "Microwave-initiated catalytic deconstruction of plastic waste into hydrogen and high-value carbons", Nat Catal 3, 902-912, 2020.) However, this process relies upon continuous re-cracking of liquids and gases under high MW power to achieve these yields. These conditions would require a high energy consumption and as such, would preclude economic scaling. In addition, this is a batch process and requires a long processing time.

In view of the above, there exists a need for reducing the amount of waste plastic globally.

Citation of any reference in this section is not to be construed as an admission that such reference is prior art to the present disclosure.

2. SUMMARY OF THE DISCLOSURE

The present disclosure provides methods and apparatuses that achieve an economically viable, commercially scalable, sustainable recycling solution for plastics and other waste materials via catalytic thermochemical decomposition of waste plastic into a clean fuel, hydrogen ($H_2$), through microwave exposure.

Advantageously, the methods and apparatuses of the disclosure can recycle a broad spectrum of waste plastics, including those which are currently unable to be utilized as post-consumer products due to pre-treatment issues, such as sanitation and contaminants.

In the methods of the disclosure, mixed waste plastic becomes feedstock for creating hydrogen. The hydrogen economy has been challenged for decades with the cost and inefficiency of its production, which requires an energy intensive, multi-step process. According to the methods of the disclosure, the energy cost for creating hydrogen fuel can be significantly decreased, while at the same time, plastic waste can be transformed into a valuable commodity instead of a costly byproduct of clean-up efforts.

The methods of the disclosure use a high temperature non-oxidative reaction under microwave. Under the reaction conditions described herein, the methods of the disclosure produce primarily hydrogen and solid carbon while producing negligible amounts of carbon monoxide (CO) and carbon dioxide ($CO_2$). In addition, the reaction conditions described herein prevent the pyrolysis of the plastics, which minimizes liquid yields while maximizing hydrogen recovery from the waste. The catalyst is also earth abundant and can be recycled and reused through the system.

Accordingly, in one embodiment, the present disclosure provides a method for producing hydrogen. The method comprises: (a) contacting a plastic with a catalyst and a gas feed; and (b) applying a microwave to heat the catalyst to a first temperature. In some aspects, the method comprises: (a) contacting a plastic with a catalyst and a gas feed; and (b) applying a microwave to heat the catalyst to a first temperature, the first temperature being in a range from about 500° C. to about 2000° C.; thereby producing hydrogen.

In a second embodiment, the present disclosure provides an apparatus for producing hydrogen. The apparatus comprises: a reactor for mixing plastic with a catalyst to form a mixture; an inlet for introducing a gas feed; a microwave generator; an optional temperature sensor; and an outlet configured to exhaust the product hydrogen formed in the reactor.

3. BRIEF DESCRIPTION OF THE FIGURES

4. DETAILED DESCRIPTION

Figure 1:
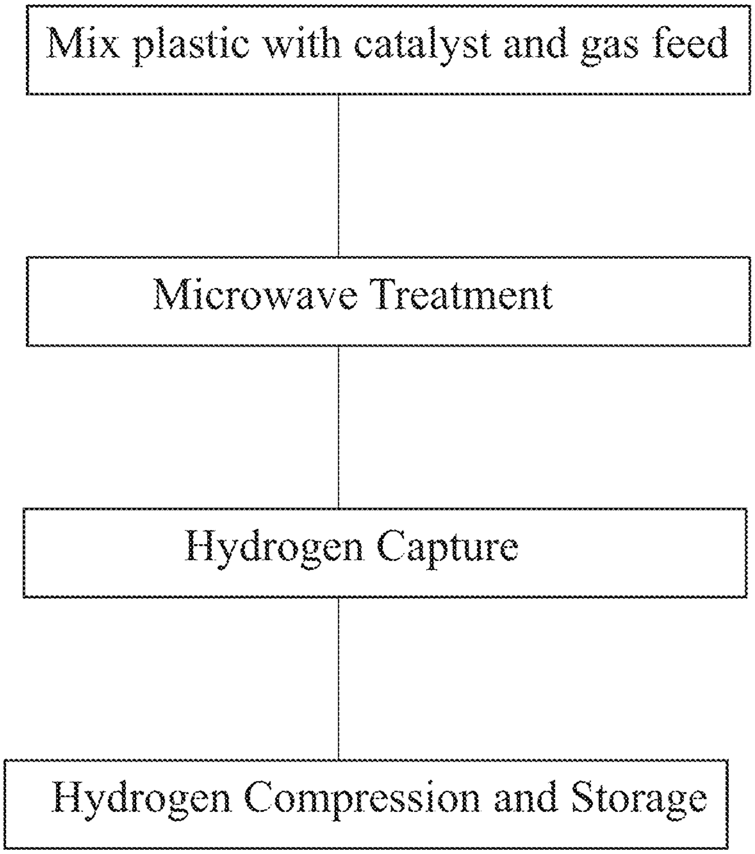
FIG. 1 shows a flow diagram illustrating steps in a method for producing hydrogen according to an embodiment of the disclosure.

The invention includes the following:

(1.) A method for producing hydrogen comprising: (a) contacting a plastic with a catalyst and a gas feed; and (b) applying a microwave to heat the catalyst to a first temperature.

(2.) The method of the above (1.), wherein the first temperature is in a range from about 200° C. to about 1200° C.

(3). The method of the above (1.) to (2.), wherein the first temperature is in a range from about 500° C. to about 900° C.

(4.) The method of the above (1.) to (3.), wherein the first temperature is in a range from about 700° C. to about 800° C.

(5.) The method of the above (1.) to (4.), wherein the microwave is applied at a frequency in a range of about 100 MHz to about 8 GHz.

(6.) The method of the above (1.) to (4.), wherein the microwave is applied at a frequency in a range of about 1 GHz to about 8 GHz.

(7.) The method of the above (1.) to (4.), wherein the microwave is applied at a frequency of about 2.45 GHz.

(8.) The method of the above (1.) to (4.), wherein the microwave is applied at a frequency of about 915 MHz.

(9.) The method of the above (1.) to (8.), wherein the microwave is applied for a duration of time in the range of about 20 seconds to about 120 seconds.

(10.) The method of the above (1.) to (9.), wherein the pressure in step (a) is in a range of about 0 psi to about 500 psi.

(11.) The method of the above (1.) to (10.), wherein the pressure in step (b) is in a range of about 0 psi to about 500 psi.

(12.) The method of the above (1.) to (11.), wherein the plastic is selected from the group consisting of polypropylene (PP), polycarbonate (PC), polystyrene (PS), polyethylene (PE), (such as low-density polyethylene (LDPE) and high-density polyethylene (HDPE)), polyvinyl chloride (PVC), acrylonitrile-butadiene-styrene (ABS), polyethylene terephthalate (PET), nylon and polyamide and combinations thereof.

(13.) The method of the above (1.) to (11.), wherein the plastic is mixed plastic waste.

(14.) The method of the above (1.) to (13.), wherein the catalyst is an earth abundant catalyst.

(15.) The method of the above (1.) to (13.), wherein the catalyst is an oxide of a metal selected from the group consisting of Ni, Co, Fe, Cu, Ce, Zr, Al, Pt, Pd, Rh, Ru, Si, and Mg, and combinations thereof.

(16.) The method of the above (1.) to (13.), wherein the catalyst is an oxide of a metal selected from the group consisting of Ni, Co, Fe, Cu, Ce, Zr, and Al and combinations thereof.

(17.) The method of the above (1.) to (13.), wherein the catalyst is an oxide of a metal selected from the group consisting of Pt, Pd, Rh, and Ru and combinations thereof.

(18.) The method of the above (17.), further comprising a supporting oxide selected from the group consisting of $SiO_2$, MgO, and $ZrO_2$.

(19.) The method of the above (1.) to (13.), wherein the catalyst is selected from the group consisting of iron oxides, supported iron, supported nickel, carbon, and iron carbides and combinations thereof.

(20.) The method of the above (1.) to (19.), wherein the gas feed comprises a gas selected from the group consisting of nitrogen, argon, water vapor, carbon dioxide, and air, and combinations thereof.

(21.) The method of the above (1.) to (20.), wherein the gas feed comprises a gas selected from the group consisting of nitrogen, argon, and helium, and combinations thereof and combinations thereof.

(22.) The method of the above (1.) to (21.), wherein step (a) includes the substep of pretreating the plastic.

(23.) The method of the above (22.), wherein the pretreating step comprises applying a microwave at a second temperature.

(24.) The method of the above (23.), wherein step (a) further includes the substep of removing waste materials from the pretreated plastic.

(25.) The method of the above (1.) or (24.), wherein step (a) includes the substep of comminuting the plastic.

(26.) The method of the above (1.) to (25.), further comprising step (c) removing hydrogen produced in step (b).

(27.) An apparatus for producing hydrogen comprising: a reactor for mixing plastic with a catalyst to form a mixture; an inlet for introducing a gas feed; a microwave generator; an optional temperature sensor; and an outlet configured to exhaust the product hydrogen formed in the reactor.

(28.) The apparatus of the above (27.), further comprising a gas storage vessel.

(29.) The apparatus of the above (27.) or (28.), further comprising a vessel for separating the produced hydrogen from by-products.

(30.) A method for producing hydrogen comprising: (a) contacting a plastic with a catalyst and a gas feed; and (b) applying a microwave to heat the catalyst to a first temperature, the first temperature being in a range from about 500° C. to about 2000° C.;

thereby producing hydrogen.

(31.) The method of the above (30.), wherein the first temperature is in a range from about 500° C. to about 900° C.

(32.) The method of the above (30.) or (31.), wherein the microwave is applied at a frequency in a range of about 100 MHz to about 8 GHz.

(33.) The method of the above (30.) to (32.), wherein the microwave is applied at a frequency of about 2.45 GHz.

(34.) The method of the above (30.) to (33.), wherein the microwave is applied continuously.
(35.) The method of the above (30.) to (34.), wherein the plastic is processed for a time in a range of 30 seconds to 10 minutes.
(36.) The method of the above (30.) to (35.), wherein the pressure in step (a) is in a range of about 0 psi to about 500 psi.
(37.) The method of the above (30.) to (36.), wherein the pressure in step (b) is in a range of about 0 psi to about 500 psi.
(38.) The method of the above (30.) to (37.), wherein the plastic is selected from the group consisting of polypropylene (PP), polycarbonate (PC), polystyrene (PS), polyethylene (PE), polyvinyl chloride (PVC), acrylonitrile-butadiene-styrene (ABS), polyethylene terephthalate (PET), nylon, and polyamide, and combinations thereof.
(39.) The method of the above (30.) to (38.), wherein the plastic is mixed plastic waste.
(40.) The method of the above (30.) to (39.), wherein the catalyst comprises an oxide of a metal selected from the group consisting of Ni, Co, Fe, Cu, Ce, Zr, Al, Si, and Mg, and combinations thereof.
(41.) The method of the above (30.) to (40.), further comprising a supporting oxide selected from the group consisting of $SiO_2$, MgO, and $ZrO_2$.
(42.) The method of the above (30.) to (39.), wherein the catalyst comprises an oxide of a metal selected from the group consisting of Mn, Fe, Co, Ni, Cu, Ti, V, Cr, Zr, Nb and W, and combinations thereof.
(43.) The method of the above (30.) to (39.), wherein the catalyst is selected from the group consisting of iron oxides, supported iron, supported nickel, carbon, and iron carbides and combinations thereof.
(44.) The method of the above (30.) to (39.), wherein the catalyst comprises magnetite.
(45.) The method of the above (30.) to (44.), wherein the gas feed comprises a gas selected from the group consisting of nitrogen, argon, and combinations thereof.
(46.) The method of the above (30.) to (45.), wherein step (a) comprises contacting the plastic with a porous media.
(47.) The method of the above (46.), wherein the porous media comprises a material selected from the group consisting of silica, alumina, zeolite, and dolomite, and combinations thereof.
(48.) The method of the above (30.) to (47.), further comprising step (c) removing hydrogen produced in step (b).
(49.) An apparatus for producing hydrogen comprising: a reactor for producing hydrogen; an inlet for introducing a gas feed; a microwave generator; an optional temperature sensor; and an outlet configured to exhaust the product hydrogen formed in the reactor.
(50.) The apparatus of the above (49.), wherein the reactor is a dual stage reactor.
(51.) The apparatus of the above (49.) or (50.), further comprising a fluidized bed.
(52.) The apparatus of the above (49.) to (51.), further comprising an inlet for introducing a catalyst.
(53.) The apparatus of the above (49.) to (52.), further comprising an inlet for introducing plastic.
(54.) The apparatus of the above (49.) to (53.), further comprising an inlet for introducing plastic and catalyst.
(55.) The apparatus of the above (49.) to (54.), further comprising a gas storage vessel.
(56.) The apparatus of the above (49.) to (55.), further comprising a vessel for separating the produced hydrogen from by-products.

4.1 Definitions

Unless clearly indicated otherwise, the following terms as used herein have the meanings indicated below.

Throughout this specification, the word "comprise" or variations such as "comprises" or "comprising" will be understood to imply the inclusion of a stated integer or groups of integers but not the exclusion of any other integer or group of integers.

The term "a" or "an" may mean more than one of an item.

The terms "and" and "or" may refer to either the conjunctive or disjunctive and mean "and/or".

The term "about" means within plus or minus 10% of a stated value. For example, "about 100" would refer to any number between 90 and 110.

The term "effective amount" of catalyst refers to an amount of catalyst that is sufficient to achieve the desired level of waste plastic conversion and/or desired product selectivity. The specific amount of catalyst in terms of wt. % in a reaction mixture required as an "effective amount" will depend on a variety of factors, including the specific catalyst chosen, the particle size of the catalyst, the amount and type of plastic, the particle size of the plastic, the amount and type of porous media, microwave power, reaction temperature and pressure, and the desired product.

The term "plastic feedstock" refers to any raw plastic material used in the methods of the disclosure. The plastic feedstock may be sorted or unsorted and/or cleaned or uncleaned plastic materials.

The term "feedstock heterogeneity" refers to the heterogeneity of the plastic mixture used in the methods of the disclosure. That is, feedstock heterogeneity refers to the similarity or dissimilarity of the plastic materials in the plastic feedstock.

The term "substantially pure plastic feedstock" refers to plastic feedstock that has a purity of greater than about 75%. In some embodiments, the purity is greater than 80%. In some embodiments, the purity is greater than 85%. In some embodiments, the purity is greater than 85%. In some embodiments, the purity is greater than 90%. In some embodiments, the purity is greater than 95%. In some embodiments, the purity is greater than 96%. In some embodiments, the purity is greater than 97%. In some embodiments, the purity is greater than 98%. In some embodiments, the purity is greater than 99%.

The term "mixed plastic waste" refers to unsorted and/or uncleaned plastic waste that originates from hospitals, industrial facilities, recycling plants, the ocean or waterways, residential homes, and retailers, among others, and includes municipal solid waste. Exemplary mixed plastic waste include, but are not limited to, plastic and styrofoam packaging, plastic bottles, plastic trays, plastic furniture, electronic shells, plastic pipes, fish nets and plastic crates.

The term "municipal solid waste" refers to waste collected by a municipality or disposed of at a municipal waste disposal site and includes residential, industrial, institutional, commercial, municipal, construction, and demolition waste.

The term "pyrolysis" in reference to plastics refers to thermochemical decomposition of plastic under an inert gas producing liquids (e.g., pyrolysis oil) as the major product.

The term "gasification" in reference to plastic refers to the decomposition of plastic that occurs at higher temperature in the presence of oxygen to produce primarily gases (which are referred to as "so-termed synthesis gas or syngas"). "Syngas" refers to a mixture of gases, primarily $H_2$ and CO with lesser amounts of nitrogen ($N_2$), $CO_2$, methane ($CH_4$) and water vapor ($H_2O$).

The term "microwave heating" refers to a method of heating a material by applying a microwave. The material is heated in the absence of plasma and no sustained non-thermal or thermal plasma is intentionally generated in the method.

The term "first temperature" refers to the temperature of the catalyst used in a method of the disclosure. In one variation, the term "first temperature" refers to the temperature of both the catalyst and porous material used in a method of the disclosure. The term "first temperature" is also referred to as the reaction temperature.

The term "second temperature" refers to the temperature during secondary processes steps either before or after the methods for producing hydrogen of the disclosure. In one embodiment, the second temperature refers to the temperature during a pre-treating step. In another embodiment, the second temperature refers to the temperature during a post-treatment step.

The term "earth abundant catalyst" refers to a catalyst comprising an earth-abundant transition metal, such as Mn, Fe, Co, Ni, Cu, Ti, V, Cr, Zr, Nb and W. Examples of earth abundant catalysts include magnetite and bauxite.

The term "designer catalyst" refers to a catalyst that is not naturally occurring or that must be synthesized and can be used to convert plastic to hydrogen. Examples of designer catalysts include, but are not limited to, $FeAlO_x$, FeMgO, FeZSM-5, $NiAl_2O_3$, and $FeAl_2O_3$.

The term "non-structured catalyst" refers to a catalyst that is not molded into a specific shape, e.g., a monolith. Non-structured catalysts can be used to increase the surface area of the catalyst.

The term "supported" catalyst refers to any material that can support the catalytic active site. Exemplary supports for a catalyst used in the methods of the disclosure include, but are not limited to, polymers, silica ($SiO_2$), alumina ($Al_2O_3$), olivine, zirconium oxide ($ZrO_2$), titanium oxide ($TiO_2$), cesium oxide ($CeO_2$), and magnesium oxide (MgO), and combinations thereof.

The term "substantially solvent deficient" refers to a reaction condition in which the reaction mixture comprises less than 1% by weight solvent. In some embodiments, the reaction mixture comprises less than 0.5% by weight solvent. In some embodiments, the reaction mixture comprises less than 0.25% by weight solvent. In some embodiments, the reaction mixture comprises less than 0.1% by weight solvent. In some embodiments, the reaction mixture comprises less than 0.05% by weight solvent.

The term "low dielectric metal oxide" refers to a metal oxide having a low dielectric constant (κ, kappa). An example of a low dielectric metal oxide is a metal oxide having a loss tangent in the range of 0 to about 0.5. Another example is a material classified as an insulator or semiconductor.

The term "batch process" for producing hydrogen refers to a method of producing hydrogen in which all the reagents are reacted in a vessel under suitable reaction conditions for a suitable length of time and converted to product. The method is terminated and the reaction mixture comprising the product is collected. No reactants are added to the reaction vessel after the method has started and no products are removed until the method is terminated.

The term "continuous process" for producing hydrogen refers to a method of producing hydrogen in which, while the method is ongoing, additional reagents can be added to the vessel and products can be removed, without terminating the method.

The term "semi-continuous process" for producing hydrogen refers to a method that is neither a batch process nor continuous process. Reagents are periodically added, and products are periodically removed during the method.

The term "processing time" refers to the amount of time for the plastic, when in contact with the catalyst, to be converted to hydrogen.

In order that the invention herein described may be fully understood, the following detailed description is set forth.

4.2 Methods of Producing Hydrogen

The present disclosure provides a method of producing hydrogen. The method comprises (a) contacting a plastic with a catalyst and a gas feed; and (b) applying a microwave to heat the catalyst to a first temperature. In some aspects, the method comprises (a) contacting a plastic with a catalyst and a gas feed; and (b) applying a microwave to heat the catalyst to a first temperature, the first temperature being in a range from about 500° C. to about 2000° C.; thereby producing hydrogen.

Step (a) comprises contacting a plastic with a catalyst and a gas feed. The plastic used in step (a) is mixed plastic waste in a first embodiment. In some aspects of this embodiment, the mixed plastic originates from a hospital. In other aspects, the mixed plastic originates from the ocean or waterways.

The plastic used in step (a), in a second embodiment, is selected from the group consisting of polypropylene (PP), polycarbonate (PC), polystyrene (PS), polyethylene (PE), (such as low-density polyethylene (LDPE) and high-density polyethylene (HDPE)), polyvinyl chloride (PVC), acrylonitrile-butadiene-styrene (ABS), polyethylene terephthalate (PET), nylon, and polyamides, and combinations thereof. In some aspects of this embodiment, the plastic is one or more materials selected from the group consisting of HDPE, PP, PET, PS, and LDPE. In some aspects of this embodiment, the plastic is two or more materials selected from the group consisting of HDPE, PP, PET, PS, and LDPE. In some aspects of this embodiment, the plastic is three or more materials selected from the group consisting of HDPE, PP, PET, PS, and LDPE. In some aspects of this embodiment, the plastic is four or more materials selected from the group consisting of HDPE, PP, PET, PS, and LDPE. In some aspects, the plastic used in step (a) is a combination of HDPE, PP, PET, PS, and LDPE.

The plastic used in step (a) can be unsorted, sorted, treated, or untreated. Methods for treating the plastic are described below.

In another aspect of this embodiment, the plastic used in step (a) can be shredded, ground, pelleted, beaded, or otherwise modified in size or form from its original form as mixed plastic waste.

The catalyst used in step (a) can be any catalyst that converts plastic to hydrogen and includes earth abundant catalysts as well as designer catalysts. In one embodiment, the catalyst is an earth abundant catalyst. In one aspect of this embodiment, the earth abundant catalyst is a non-structured catalyst. In another aspect, the earth abundant catalyst is a structured catalyst. In one embodiment, the catalyst comprises an earth-abundant transition metal, such as Mn, Fe, Co, Ni, Cu, Ti, V, Cr, Zr, Nb and W.

In another embodiment, the catalyst is an oxide of a metal selected from the group consisting of Ni, Co, Fe, Cu, Ce, Zr, Al, Pt, Pd, Rh, Ru, Si, and Mg, and combinations thereof. In some embodiment, the catalyst is an oxide of a metal selected from the group consisting of Ni, Co, Fe, Cu, Ce, Zr, Al, Si, and Mg, and combinations thereof. In some embodiments, the catalyst is an oxide of a metal selected from the group consisting of Ni, Co, Fe, Cu, Ce, Zr, and Al and combinations thereof. In other embodiments, the catalyst is an oxide of a metal selected from the group consisting of Pt, Pd, Rh, and Ru and combinations thereof. In yet other embodiments, the catalyst is selected from the group consisting of iron oxides, supported iron, supported nickel, carbon, and iron carbides and combinations thereof.

In another embodiment, the catalyst comprises iron. In some aspects of this embodiment, the catalyst is selected from magnetite, bauxite, bauxite residual (also known as "red mud"), Fe, $Fe_3C$, FeO, $Fe_2O_3$, $Fe_3O_4$, and combinations thereof. In some aspects of this embodiment, the catalyst comprising iron is recovered from a prior method of the disclosure and recycled so that it may be used again. Recycling and reusing the catalyst advantageously reduces natural resources from being mined and processed and lowers material and operational costs.

In various embodiments, the method further comprises a natural mineral catalyst, such as dolomite or olivine. In other embodiments, the method further comprises a supporting oxide selected from the group consisting of $SiO_2$, MgO, and $ZrO_2$.

In one embodiment of the methods of the disclosure, the catalyst comprises $Ni/Al_2O_3$ and/or Ni—Mg—Al. In some aspects of this embodiment, method further comprises using one or more natural mineral catalysts, such as dolomite or olivine.

In another embodiment of the methods of the disclosure, the catalyst comprises a compound selected from the group consisting of $Al(NO_3)_3 9H_2O$, $Ce(NO_3)_3 6H_2O$, $ZrO(NO_3)_2 \times H_2O$, $NH_4HCO_3$, and $Ni(NO_3)_2\ 6H_2O$.

In another embodiment of the methods of the disclosure, the catalyst is not $NiFe_2O_4$. In other embodiments, the catalyst is not nanosized $NiFe_2O_4$. In other embodiments, the catalyst is not nanosized $NiFe_2O_4$ prepared by a sol-gel method.

In another embodiment, the catalyst is not $Ti_3AlC_2$.

It should be understood that the particle size and surface area for any particular catalyst will depend on a variety of factors, including the type of catalyst, the amount of catalyst used, the catalyst to plastic ratio, the presence of porous media, the ratio of porous media to plastic feedstock, the reaction conditions, temperature, gas flow rate, and the apparatus design.

The amount of catalyst used in step (a) is an effective amount. In some embodiments, the catalyst is present in an amount ranging from about 20 wt % to about 50 wt %, about 25 wt % to about 45 wt %, about 30 wt % to about 40 wt %, about 20 to about 45 wt %, about 20 wt % to about 40 wt %, about 20 wt % to about 35 wt %, about 20 wt % to about 30 wt %, about 25 wt % to about 50 wt %, about 30 wt % to about 50 wt %, about 35 wt % to about 50 wt %, or about 40 wt % to about 50 wt %. In particular embodiments, the catalyst is present in an amount of about 20 wt %, about 25 wt %, about 30 wt %, about 35 wt %, about 40 wt %, about 45 wt %, or about 50 wt %.

In each embodiment of the methods of the disclosure, the ratio of catalyst to plastic is in the range of about 1:9 to about 3:4. In some embodiments, the ratio of catalyst to plastic is in the range of about 1:4 to about 3:4. In some embodiments, the ratio of catalyst to plastic is in the range of about 1:3 to about 3:1. In some embodiments, the ratio of catalyst to plastic is about 1:1, about 1:2, about 1:3, about 1:4, about 1:5, about 1:6, about 1:7, about 1:8, about 1:9 or about 1:10. In some embodiments the ratio of catalyst to plastic is about 1:1.

The gas feed used in step (a) comprises a gas selected from the group consisting of nitrogen, argon, helium, water vapor, carbon dioxide, and air, and combinations thereof. In some embodiments, the gas feed used in step (a) comprises a gas selected from the group consisting of nitrogen, argon, water vapor, carbon dioxide, and air, and combinations thereof. In some embodiments, the gas feed used in step (a) comprises a gas selected from the group consisting of nitrogen, argon, and helium, and combinations thereof. In some embodiments, the gas feed used in step (a) comprises hydrocarbons obtained from following prior methods of the disclosure and recycled. The gas used in step (a) can be referred to as "fluidizing gas". The gas used in step (a) is unheated (substantially room temperature).

It should be understood that the flow rate of the gas feed used in step (a) will depend on a variety of factors, including the type of catalyst, the particle size of the catalyst used, the uniformity of the particle size of the catalyst used, the mass of the catalyst used, the size and density of the plastic used, the ratio of the catalyst to plastic feedstock, the size of the reactor, and the reaction conditions.

The flow rate of the gas used in step (a) can be in the range of about 10 SCCM to about 1000 SCCM (standard cubic centimeters per min). In some embodiments, the gas flow rate can be in the range of about 20 SCCM to about 1000 SCCM, about 30 SCCM to about 1000 SCCM, about 40 SCCM to about 1000 SCCM, about 50 SCCM to about 1000 SCCM, about 60 SCCM to about 1000 SCCM, about 70 SCCM to about 1000 SCCM, about 80 SCCM to about 1000 SCCM, about 90 SCCM to about 1000 SCCM, about 100 SCCM to about 1000 SCCM, about 150 SCCM to about 1000 SCCM, about 200 SCCM to about 1000 SCCM, about 250 SCCM to about 1000 SCCM, about 300 SCCM to about 1000 SCCM, about 350 SCCM to about 1000 SCCM, about 400 SCCM to about 1000 SCCM, about 500 SCCM to about 1000 SCCM, about 600 SCCM to about 1000 SCCM, about 700 SCCM to about 1000 SCCM, about 800 SCCM to about 1000 SCCM, or about 900 SCCM to about 1000 SCCM. In some embodiments, the gas flow rate can be in the range of about 10 SCCM to about 900 SCCM, about 10 SCCM to about 800 SCCM, about 10 SCCM to about 700 SCCM, about 10 SCCM to about 600 SCCM, about 10 SCCM to about 500 SCCM, about 10 SCCM to about 450 SCCM about 10 SCCM to about 400 SCCM, about 10 SCCM to about 350 SCCM about 10 SCCM to about 300 SCCM, about 10 SCCM to about 250 SCCM, about 10 SCCM to about 200 SCCM, about 10 SCCM to about 150 SCCM, or about 10 SCCM to about 100 SCCM. In some embodiments, the gas flow rate can about 10 SCCM, about 20 SCCM, about 30 SCCM, about 40 SCCM, about 50 SCCM, about 60 SCCM, about 70 SCCM, about 80 SCCM, about 90 SCCM, about 100 SCCM, about 125 SCCM, about 150 SCCM, about 175 SCCM, about 200 SCCM, about 225 SCCM, about 250 SCCM, about 275 SCCM, about 300 SCCM, about 325 SCCM, about 350 SCCM, about 375 SCCM, about 400 SCCM, about 425 SCCM, about 450 SCCM, about 475 SCCM, about 500 SCCM, about 525 SCCM, about 550 SCCM, about 575 SCCM, about 600 SCCM, about 625 SCCM, about 650 SCCM, or about 675 SCCM.

When the size of the reactor is increased, for example, to one suitable for an industrial process, the flow rate is increased such that it is sufficient to fluidize the catalyst bed.

The flow of gas in step (a) is continuous or substantially continuous. By substantially continuous flow, it is meant that the gas is flowed over a period of time during the course of step (a) and can be briefly interrupted during the period, in contrast to purging in which the gas is flowed briefly as a means to remove unwanted gases, moisture, and other impurities.

In some embodiments, step (a) comprises mechanically mixing the catalyst with plastic and porous media, if present. In other embodiments, step (a) comprises applying a solution comprising the catalyst onto the plastic and porous media, if present, to form a mixture and optionally drying the mixture.

In some embodiments, step (a) further comprises a solvent. In other embodiments, step (a) is substantially solvent deficient.

In some embodiments, step (a) further comprises contacting the plastic with a porous media. The porous media used in step (a) is a material that is inert to the microwaves applied in step (b) or inert to microwave absorption. Examples of porous media that can be used in step (a) include low dielectric oxides (such as, alumina, silica, zeolite, dolomite), and high surface area porous mineral-based materials.

In embodiments in which the porous media is a low dielectric oxide, the dielectric constant is in the range of about 0.5 to about 10. In some aspects of this embodiment, the dielectric constant of the porous media is in the range of about 0.5 to about 9, about 0.5 to about 8, about 0.5 to about 7, about 0.5 to about 6, about 0.5 to about 5, about 0.5 to about 4, about 0.5 to about 3, about 0.5 to about 2, about 0.5 to about 1, about 1 to about 10, about 1.5 to about 10, about 2 to about 10, about 2.5 to about 10, about 3 to about 10, about 3.5 to about 10, about 4 to about 10, about 4.5 to about 10, about 5 to about 10, about 5.5 to about 10, about 6 to about 10, about 6.5 to about 10, about 7 to about 10, about 7.5 to about 10, about 8 to about 10, about 8.5 to about 10, about 9 to about 10, or about 9.5 to about 10, High surface area porous materials are those that have a surface area above in the range of about 10 $m^2/g$ to about 1000 $m^2/g$ and pore sizes in the range of about 10 nm to about 50 nm. In some embodiments, the porous media comprises a material selected from the group consisting of silica, alumina, and zeolites, and combinations thereof.

In some aspects of this embodiment, the particular porous media has a surface area in the range of about 10 $m^2/g$ to about 900 $m^2/g$, about 10 $m^2/g$ to about 800 $m^2/g$, about 10 $m^2/g$ to about 700 $m^2/g$, about 10 $m^2/g$ to about 600 $m^2/g$, about 10 $m^2/g$ to about 500 $m^2/g$, about 10 $m^2/g$ to about 400 $m^2/g$, about 10 $m^2/g$ to about 300 $m^2/g$, about 10 $m^2/g$ to about 200 $m^2/g$, about 10 $m^2/g$ to about 100 $m^2/g$, about 50 $m^2/g$ to about 900 $m^2/g$, about 100 $m^2/g$ to about 900 $m^2/g$, about 150 $m^2/g$ to about 900 $m^2/g$, about 200 $m^2/g$ to about 900 $m^2/g$, about 250 $m^2/g$ to about 900 $m^2/g$, about 300 $m^2/g$ to about 900 $m^2/g$, about 350 $m^2/g$ to about 900 $m^2/g$, about 400 $m^2/g$ to about 900 $m^2/g$, about 450 $m^2/g$ to about 900 $m^2/g$, about 500 $m^2/g$ to about 900 $m^2/g$, about 600 $m^2/g$ to about 900 $m^2/g$, about 700 $m^2/g$ to about 900 $m^2/g$, or about 800 $m^2/g$ to about 900 $m^2/g$.

In some aspects of this embodiment in which porous media is present, the particular porous media has a pore size in the range of about 10 nm to about 40 nm, about 10 nm to about 30 nm, about 10 nm to about 20 nm, about 20 nm to about 50 nm, about 30 nm to about 50 nm, or about 40 nm to about 50 nm.

In some aspects of this embodiment in which porous media is present, the particular porous media has a surface area above about 100 $m^2/g$ and pore sizes larger than about 10 nm, a surface area of about 200 $m^2/g$ and pore sizes larger than about 10 nm, a surface area of about 300 $m^2/g$ and pore sizes larger than about 10 nm, a surface area of about 400 $m^2/g$ and pore sizes larger than about 10 nm, a surface area of about 500 $m^2/g$ and pore sizes larger than about 10 nm, a surface area of about 600 $m^2/g$ and pore sizes larger than about 10 nm, a surface area of about 700 $m^2/g$ and pore sizes larger than about 10 nm, a surface area of about 800 $m^2/g$ and pore sizes larger than about 10 nm, a surface area of about 900 $m^2/g$ and pore sizes larger than about 10 nm, a surface area of about 1000 $m^2/g$ and pore sizes larger than about 10 nm, a surface area of about 100 $m^2/g$ and pore sizes of about 20 nm, a surface area of about 100 $m^2/g$ and pore sizes of about 30 nm, a surface area of about 100 $m^2/g$ and pore sizes of about 40 nm, or a surface area of about 100 $m^2/g$ and pore sizes of about 50 nm.

In each embodiment of the methods of the disclosure, the ratio of porous media to plastic feedstock is about 1:1, about 1:2, about 1:3, about 1:4, about 1:5, about 1:6, about 1:7, about 1:8, about 1:9, or about 1:10.

In each embodiment of the methods of the disclosure, the ratio of porous media to catalyst is about 1:1, about 1:2, about 1:3, about 1:4, about 1:5, about 1:6, about 1:7, about 1:8, about 1:9, or about 1:10.

It should be understood that the porosity and surface area for any particular porous media will depend on a variety of factors, including the type of porous media used, the reaction conditions, the size and density of the plastic feedstock, and feedstock heterogeneity.

The pressure in step (a) is in a range of about 0 psi to about 500 psi. In some embodiments, the pressure in step (a) is in a range of about 100 psi to about 400 psi. In some embodiments, the pressure in step (a) is in a range of about 200 psi to about 300 psi. In some embodiments, the pressure in step (a) is about 0 psi, about 50 psi, about 100 psi, about 150 psi, about 200 psi, about 250 psi, about 300 psi, about 400 psi, about 450 psi, or about 500 psi.

The contacting step (a) can take place in a fixed bed or a fluidized bed. In embodiments in which the contacting step is in a fixed bed, the fixed bed comprises two layers. The first layer comprises plastic and porous media, if present, and the second layer, located on top of the first layer, comprises catalyst.

In embodiments in which the contacting step is in a fluidized bed, the plastic and porous media, if present, are fluidized with the catalyst. In this embodiment, when the catalyst is heated, it will conduct heat to the plastic. The fluidized bed can be upflow, circulating, or bubbling.

In some embodiments, step (a) comprises substep (i) of placing the porous media and plastic on a fluidized bed. The fluidized bed can be upflow, circulating, or bubbling.

In some embodiments, step (a) comprises substep (i) of contacting the plastic with catalyst and porous media, if present, to form a mixture; and substep (ii) of introducing the mixture into a reactor.

In some embodiments, step (a) comprises substep (i) of introducing the plastic to a mixture of catalyst and porous media, if present. The catalyst and porous media, if present, can be on a fluidized bed. The fluidized bed can be upflow, circulating, or bubbling.

Step (b) of the methods of the disclosure comprises applying a microwave to heat the catalyst to a first temperature. The microwave that is applied is sufficient to result in microwave heating of the catalyst in one embodiment and both the catalyst and porous media mixture in another embodiment.

In various embodiments, the microwave is applied at a frequency in a range of about 100 MHz to about 8 GHz. In some embodiments, the microwave is applied at a frequency in a range of about 1 GHz to about 8 GHz, in a range of about 1 GHz to about 7 GHz, in a range of about 1 GHz to about 6 GHz, in a range of about 1 GHz to about 5 GHz, in a range of about 1 GHz to about 4 GHz, or in a range of about 1 GHz to about 3 GHz. In some embodiments, the microwave is applied at a frequency in a range of about 100 MHz to about 3 GHz, in a range of about 200 MHz to about 3 GHz, in a range of about 300 MHz to about 3 GHz, in a range of about 400 MHz to about 3 GHz, in a range of about 500 MHz to about 3 GHz, in a range of about 600 MHz to about 3 GHz, in a range of about 700 MHz to about 3 GHz, in a range of about 800 MHz to about 3 GHz, in a range of about 900 MHz to about 3 GHz, in a range of about 900 MHz to about 2.5 GHz, in a range of about 900 MHz to about 2 GHz, in a range of about 900 MHz to about 1.5 GHz, or in a range of about 900 MHz to about 1 GHz. In some embodiments, the microwave is applied at a frequency of about 2.45 GHz. In other embodiments, the microwave is applied at a frequency of about 915 MHz.

The microwave is applied for a duration of time in the range of about 20 seconds to about 120 seconds. In some embodiments, the microwave is applied for a duration of time in the range of about 20 seconds to about 110 seconds. In some embodiments, the microwave is applied for a duration of time in the range of about 20 seconds to about 100 seconds. In some embodiments, the microwave is applied for a duration of time in the range of about 20 seconds to about 90 seconds. In some embodiments, the microwave is applied for a duration of time in the range of about 30 seconds to about 80 seconds. In some embodiments, the microwave is applied for a duration of time in the range of about 40 seconds to about 70 seconds. In some embodiments, the microwave is applied for a duration of time in the range of about 50 seconds to about 60 seconds.

In one embodiment, the microwave can be applied under continuous conditions, varying the power to maintain the first temperature. In another embodiment, the microwave is pulsed.

In embodiments in which the microwave is continuously applied, the processing time of the plastic is a time in a range of about 30 seconds to about 20 minutes. In some embodiments, the processing time is in a range of about 1 minute to about 10 minutes, about 2 minutes to about 10 minutes, about 3 minutes to about 10 minutes, about 4 minutes to about 10 minutes, about 5 minutes to about 10 minutes, about 6 minutes to about 10 minutes, about 7 minutes to about 10 minutes, about 8 minutes to about 10 minutes, about 9 minutes to about 10 minutes, about 30 seconds to about 10 minutes, about 30 seconds to about 9 minutes, about 30 seconds to about 8 minutes, about 30 seconds to about 7 minutes, about 30 seconds to about 6 minutes, about 30 seconds to about 5 minutes, about 30 seconds to about 4 minutes, about 30 seconds to about 3 minutes, or about 30 seconds to about 2 minutes. In some embodiments, the processing time is about 30 seconds, about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, or about 15 minutes.

The power of the microwave used in step (b) is dependent on the scale of the method of the disclosure (e.g., the amount of catalyst used). For example, when the scale of the method is larger (e.g., industrial scale), the power of the microwave is higher. Conversely, when the scale of the method is smaller, the power of the microwave is lower. In some embodiments, the microwave power is about 400 W per gram of catalyst used, about 350 W per gram of catalyst used, about 300 W per gram of catalyst used, about 250 W per gram of catalyst used, about 200 W per gram of catalyst used, about 150 W per gram of catalyst used, or about 100 W per gram of catalyst used.

The first temperature is a temperature in a range from about 200° C. to about 1200° C. In some embodiments, the first temperature is a temperature in a range from about 400° C. to about 1100° C.

In some embodiments, the first temperature is a temperature in a range from about 600° C. to about 1000° C. In some embodiments, the first temperature is a temperature in a range from about 500° C. to about 900° C. In some embodiments, the first temperature is a temperature in a range from about 500° C. to about 800° C. In some embodiments, the first temperature is a temperature in a range from about 500° C. to about 700° C. In some embodiments, the first temperature is a temperature in a range from about 700° C. to about 800° C.

In some embodiments, the first temperature is a temperature in a range from about 500° C. to about 2000° C., a range from about 500° C. to about 1900° C., a range from about 500° C. to about 1800° C., a range from about 500° C. to about 1700° C., a range from about 500° C. to about 1600° C., a range from about 500° C. to about 1500° C., a range from about 500° C. to about 1400° C., a range from about 500° C. to about 1300° C., a range from about 500° C. to about 1200° C., a range from about 500° C. to about 1100° C., a range from about 500° C. to about 1000° C., or a range from about 500° C. to about 900° C.

In some embodiments, the first temperature is a temperature in a range from about 400° C. to about 1100° C., from about 400° C. to about 1000° C., from about 400° C. to about 900° C., from about 400° C. to about 800° C., or from about 400° C. to about 700° C. In other embodiments, the first temperature is a temperature in a range from about 450° C. to about 1100° C., from about 450° C. to about 1000° C., from about 450° C. to about 900° C., from about 450° C. to about 800° C., or from about 450° C. to about 750° C.

In particular embodiments, the first temperature is a temperature greater than about 450° C., about 475° C., about 500° C., about 525° C., about 550° C., about 575° C., about 600° C., about 625° C., about 650° C., about 675° C., about 700° C., about 725° C., about 750° C., about 775° C., about 800° C., about 825° C., about 850° C., about 875° C., about 900° C., about 925° C., about 950° C., about 1000° C., about 1025° C., about 1050° C., about 1075° C., about 1100° C., about 1125° C., about 1150° C., about 1200° C., about 1250° C., about 1300° C., about 1350° C., about 1400° C., about 1450° C., about 1500° C., about 1550° C., about 1600° C., about 1650° C., about 1700° C., about 1750° C., about 1800° C., about 1850° C., about 1900° C., or about 1950° C.

Without being bound by theory, it is believed that, when the first temperature is in a range from about 450° C. to about 2000° C., the methods of the disclosure result in a higher output of hydrogen.

The pressure in step (b) is in a range of about 0 psi to about 500 psi. In some embodiments, the pressure in step (b) is in a range of about 100 psi to about 400 psi. In some embodiments, the pressure in step (b) is in a range of about 200 psi to about 300 psi. In some embodiments, the pressure in step (a) is about 0 psi, about 50 psi, about 100 psi, about 150 psi, about 200 psi, about 250 psi, about 300 psi, about 400 psi, about 450 psi, or about 500 psi.

Without being bound by theory, it is believed that the presence of porous media in step (a) increases the residence of time of the plastic in the reactor. The increase in residence time allows for substantially full decomposition of the plastics, tars, and hydrocarbons into hydrogen and carbon.

It is also believed that porous media is microwave inert and can be used to control the plastic's rate of pyrolysis. This makes it possible to achieve better outputs.

The presence of porous media also changes the carbon outputs, what carbon solids are produced, and how much of a particular solid can be made.

Optionally, prior to contacting the plastic with the catalyst and gas feed in step (a), the plastic is (i) pretreated; and/or (ii) comminuted.

In another embodiment, in pretreating step, the plastic is cleaned or sanitized, and impurities or waste materials are removed. Such impurities or waste materials include organic residues, odor constituents, adhesives, inks, and plastic additives (plasticizers, antioxidants, acid scavengers, light and heat stabilizers, lubricants, pigments, antistatic agents, slip compounds and thermal stabilizers).

Methods for pretreating plastic are known in the art. See, e.g., Kol et al., "Recent Advances in Pre-Treatment of Plastic Packaging Waste," Aug. 13, 2021, available on the World Wide Web at intechopen.com/online-first/77840. Exemplary methods for pretreating plastic include chemical washing, deodorization, deinking, delamination, extraction methods, dissolution-based pretreatments (dissolution-precipitation methods and solid-liquid extraction methods). Solid-liquid extraction methods include ultrasonic extraction, supercritical fluid extraction, microwave-assisted extraction, and accelerated solvent extraction. Any of these methods may be used in the pretreatment step either alone or in combination.

In some embodiments, the pretreating step comprises applying a microwave at a second temperature. The second temperature is a temperature below about 150° C., below about 140° C., below about 130° C., below about 120° C., below about 110° C., below about 100° C., below about 90° C., below about 80° C., below about 70° C., below about 60° C., or below about 50° C.

After the pretreatment step, waste materials are removed from the pretreated plastic. By removing the waste materials, substantially pure plastic feedstock is prepared.

In the comminuting step, the plastic is ground into plastic particles. The comminuting step can be accomplished by methods known in the art, for example, using a mortar and pestle for small amounts of plastic or using a grinder, such as mining grinders, for large amounts of plastic.

In some embodiments, the comminuting step is performed at a second temperature. The second temperature is a temperature below about 150° C., below about 140° C., below about 130° C., below about 120° C., below about 110° C., below about 100° C., below about 90° C., below about 80° C., below about 70° C., below about 60° C., or below about 50° C. The size of the resulting plastic particles ranges from about 1 mm to about 10 mm. In some embodiments, the size of the resulting plastic particles ranges from about 1 mm to about 8 mm. In some embodiments, the size of the resulting plastic particles ranges from about 1 mm to about 7 mm. In some embodiments, the size of the resulting plastic particles ranges from about 1 mm to about 6 mm. In some embodiments, the size of the resulting plastic particles ranges from about 1 mm to about 5 mm. In some embodiments, the size of the resulting plastic particles ranges from about 1 mm to about 4 mm. In some embodiments, the size of the resulting plastic particles ranges from about 1 mm to about 3 mm.

It should be recognized that, in order to obtain the desired particle size, the plastic particles may need to be ground more than once. In some embodiments, the particles having the desired size can be removed from larger-sized particles. This allows the larger-sized particles to be ground again. This process can be repeated until all particles have the desired size. Continuous throughput methods for grinding and removing are known in the art. An example uses vacuum eductor methods.

The methods of the disclosure may optionally further comprise step (c) removing the hydrogen produced in step (b). In this step, the produced hydrogen is removed from the reactor. In this removal step, the produced hydrogen may be removed together with non-hydrogen by-products, such as hydrocarbons (such as methane and ethylene), carbon dioxide, tars, carbon products, etc. Alternatively, the produced hydrogen may be separated from the non-hydrogen by-products.

Optionally, the removal step includes a substep of purifying the produced hydrogen. In this step, the produced hydrogen is filtered from the non-hydrogen by-products.

As an alternative, the removal step includes substeps of (i) purifying the produced hydrogen and (ii) purifying the produced carbon products.

Methods for separating solids from gases are well known in the art. Suitable devices for performing this separation include cyclone separators, filtration (such as membrane filtration), and pressure swing adsorption devices.

In embodiments in which hydrocarbons are separated from the produced hydrogen, the hydrocarbons may be recycled back into the fluidizing gas.

In embodiments in which carbon products are separated from the produced hydrogen, the carbon products may be recycled back into the reactor and used as a nucleation site for carbon growth.

The methods of the disclosure may optionally further comprise step (d) removing the catalyst used in step (b). By removing the catalyst after step (b), it may be recycled/recirculated and used again.

Advantageously, the methods of the disclosure convert waste plastic to valuable $H_2$ and solid carbon, thus extracting useful energy from the waste plastic while closing the carbon loop. The methods provide a beneficial reuse of the plastic portion of municipal solid waste for both energy and carbon sequestration, thus helping to combat climate change and drawing down atmospheric carbon. The methods of the disclosure are performed semi-continuously and can be scaled up to continuously.

4.3 Apparatuses for Producing Hydrogen

The present disclosure provides an apparatus for producing hydrogen. The apparatus comprises a reactor for reacting plastic with a catalyst to form a mixture; an inlet for introducing a gas feed; a microwave generator; an optional temperature sensor; and an outlet configured to exhaust the product hydrogen formed in the reactor.

Figure 2:
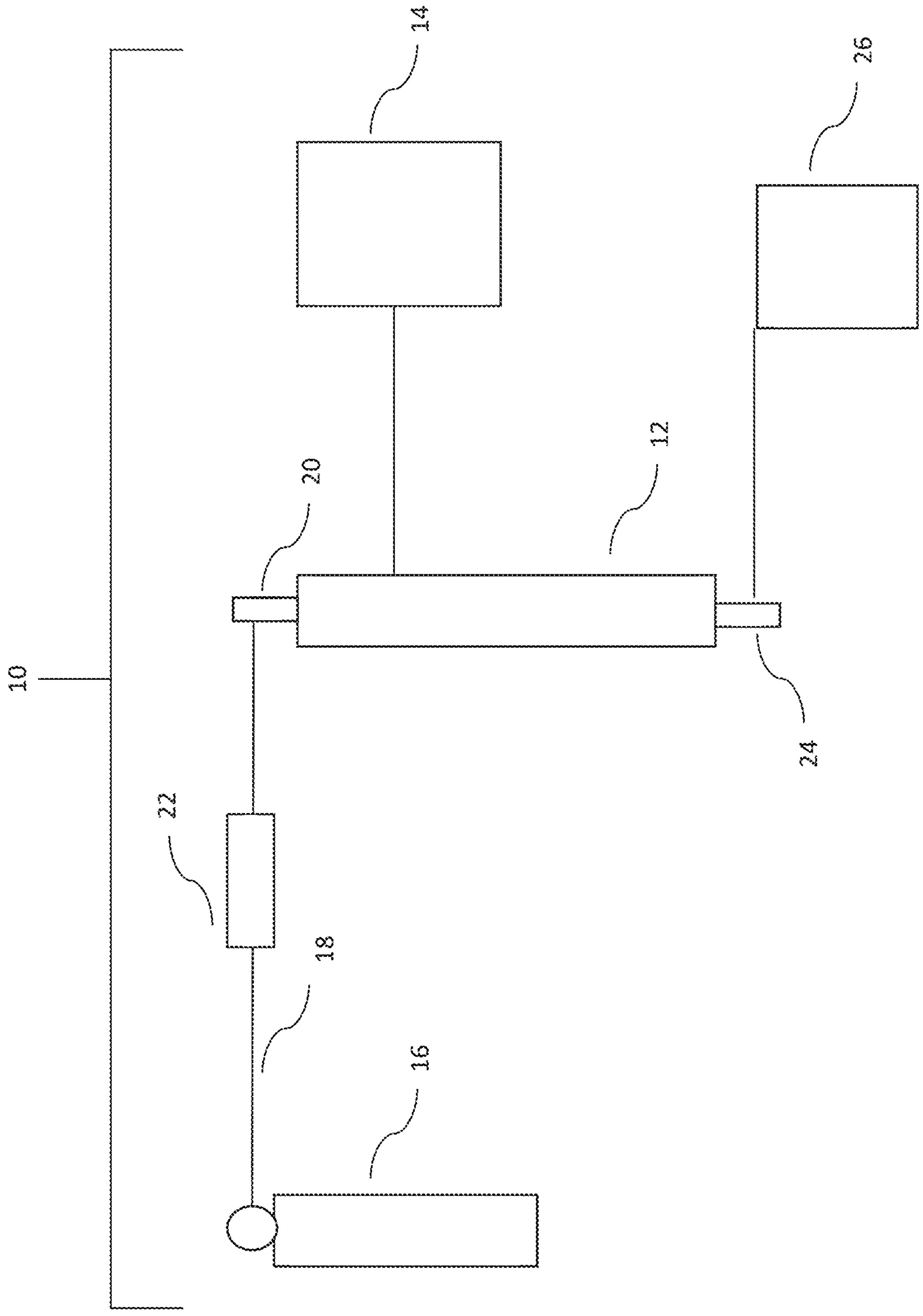
FIG. 2 shows a schematic diagram of an apparatus for producing hydrogen according to an embodiment of the disclosure.

Referring to FIG. 2, an apparatus for producing hydrogen is provided. The apparatus 10 includes a reactor 12 and a microwave generator 14. The apparatus also includes a gas supply 16 in flow communication with the reactor 12 via gas supply conduit 18. Gas supply conduit 18 contains shut off valve 22. In the illustrative embodiment, the apparatus contains a single gas supply 16. However, it is to be understood that the apparatus 10 can be modified to contain additional gas supplies, each in flow communication with the reactor 12 via a gas supply conduit, which, in turn, contains a shut off valve. The reactor 12 includes an inlet 20 in flow communication with gas supply conduit 18. The gas supply comprises an inert gas, such as nitrogen, argon, or helium.

The reactor 12 also includes an outlet 24. The outlet 24 is configured to exhaust the product hydrogen formed in the reactor 12. The outlet 24 can be in flow communication with a hydrogen gas storage vessel 26 configured to store the product hydrogen for future use.

The microwave generator 14 is configured to direct microwave radiation into the reactor 12.

The apparatus 10 also includes a temperature sensor (not shown) configured to measure the temperature of the reactor. The temperature sensor detects the temperature of the catalyst so that the catalyst temperature may be optimized. In some operations, it is desirable to have multiple temperature sensors at different locations within the apparatus 10.

The apparatus 10 can be configured to include additional components. For example, in some embodiments, the apparatus includes a mechanical mixer or other device that facilitates the mixing of the catalyst, plastic, and porous media, if present. The apparatus 10 can also include a vessel for separating the product hydrogen from by-products. The separating vessel can be in flow communication with the outlet 24 and with hydrogen storage vessel 26.

In embodiments in which the plastic is pretreated, the apparatus 10 can include a waste vessel 34 (not shown). The waste vessel can be in flow communication with outlet 28 (not shown) on reactor 12. The waste vessel serves to separate the pre-treated plastic from waste materials.

The apparatus can further include a grinder 30 (not shown) to grind the plastic, either pre-treated or untreated, to a desired particle size. Particles of the desired size are introduced into the reactor 12. Grinder 30 can be connected with a vacuum eductor 32 such that the grinded particles can be continuously grounded until the desired size is reached.

Figure 3:
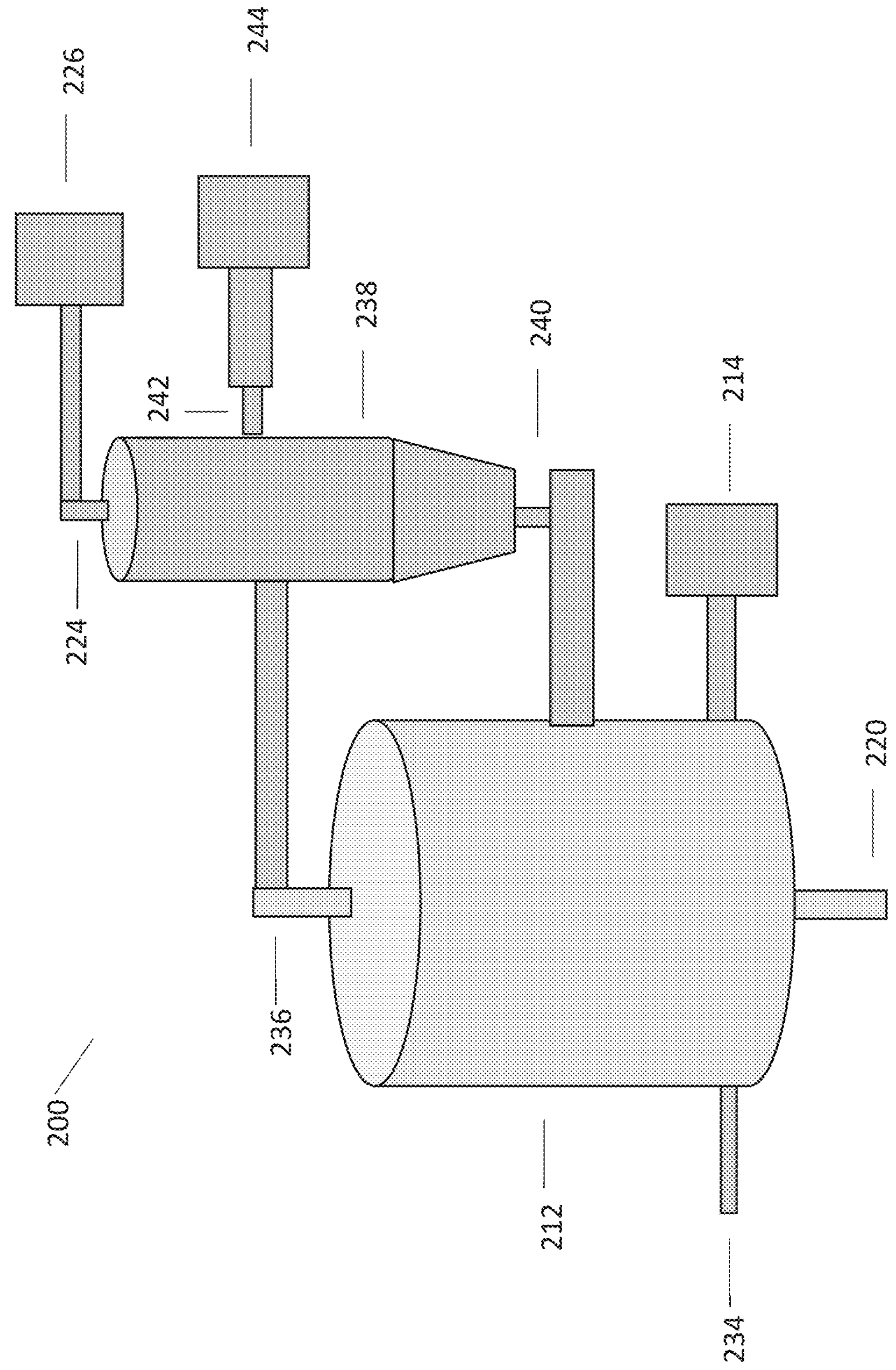
FIG. 3 shows a schematic diagram of an apparatus for producing hydrogen according to an embodiment of the disclosure.

FIG. 3 shows an embodiment of the disclosure in which the apparatus includes a vessel for separating the product hydrogen from by-products. As shown, apparatus 200 includes reactor 212 and microwave generator 214. The reactor includes inlet(s) 234 for introducing the plastic, catalyst, and porous media into reactor 212.

The reactor 212 also includes an inlet 220 in flow communication with gas supply conduit 218 (not shown) via shut off valve 222 (not shown). Depending on the size of reactor 220 and the reaction conditions, apparatus 200 can be modified to contain more than one gas supply.

The reactor 212 includes an outlet 236. The outlet 236 is configured to exhaust reaction mixture hydrogen formed in the reactor 212. The outlet 236 can be in flow communication with a separation vessel 238 configured to separate the reaction products from the catalyst. Separation vessel 238 contains outlets 224, 240, and 242. Outlet 224 is in flow communication with hydrogen gas storage vessel 226, which is configured to store the product hydrogen for future use. Outlet 240 is in flow communication with reactor 212 and is configured to recycle catalyst to the reactor 212. Outlet 242 is in flow communication with vessel 244 configured to store the carbon by-products.

Figure 4:
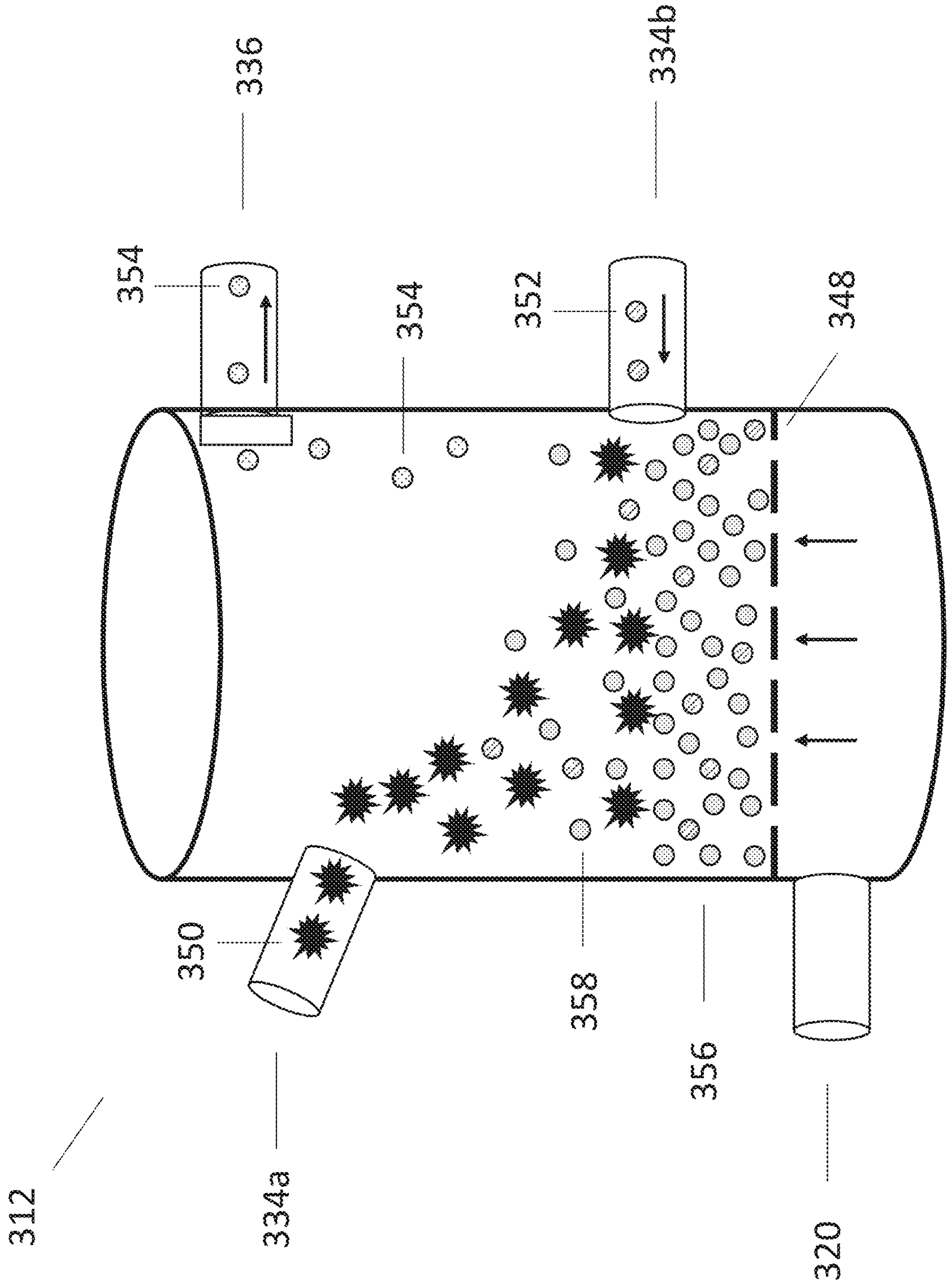
FIG. 4 shows a schematic diagram of a reactor according to an embodiment of the disclosure.

FIG. 4 shows a reactor according to an embodiment of the disclosure. Reactor 312 includes an inlet 334*a* for introducing the plastic 350, an inlet 334*b* for introducing catalyst 352, and an inlet (not shown) for introducing porous media 358. The catalyst 352 may be fresh catalyst or recycled catalyst. Recycled catalyst may be comingled with hydrocarbon. The reactor 312 also includes an inlet 320 in flow communication with gas supply conduit 318 (not shown) via shut off valve 322 (not shown). The microwave generator (not shown) is configured to direct microwave radiation into the reactor 212.

The reactor 312 includes an outlet 336. The outlet 336 is configured to exhaust reaction mixture 354 hydrogen and carbon products formed in the reactor 312.

The reactors described herein are dual-stage reactors and comprise either a fixed bed or a fluidized bed. In the fixed bed arrangement, the reactor comprises (a) a bed for holding the plastic and the porous media, if present; and (b) a bed for holding the catalyst. Here, the bed for holding the catalyst is placed on top of the bed for holding the plastic and porous media, if present. The two beds are in contact at their interface. The arrangement of the beds in this way creates a secondary reactor.

In the fluidized arrangement, the reactor comprises a fluidized bed comprising the plastic, the porous media, if present, and catalyst. The fluidized bed can be upflow, circulating or bubbling. Here, the catalyst will be fluidized with the plastic but it will be selectively heated by the microwaves. The heated catalyst will conduct heat to the plastics.

Turning back to FIG. 4, the reactor 312 includes a fluidized bed 356 and a distributor plate 348. The distributor plate contains holes that are sized and spaced to provide gas entry into the fluidized bed and to prevent channeling of the gas through the catalyst.

Advantageously, the use of a dual stage reactor allows for selective heating of the microwave. The catalyst can be heated to a different temperature from the plastic and porous media, if present. The plastics do not absorb microwave energy, preventing the melting of the plastic before the catalyst has reacted the reactive temperature for bond breakage. Another advantage is that the temperature of the catalyst can be maintained at a temperature higher than the pyrolysis temperature.

The apparatuses described herein can be optionally connected to one or more analytical instruments to monitor, detect, or measure the reaction products at specific time intervals. Analytical instruments include, but are not limited to, gas chromatography instruments and mass spectrometers.

The apparatuses of the disclosure can produce hydrogen semi-continuously and can be scaled up to continuous hydrogen production.

5. EXAMPLES

The following examples are presented for illustrative purposes and are not to be construed as limiting the scope of the disclosed subject matter.

Example 1. Materials and Apparatus

Granular mixed plastic waste (MPW) with approximately 3 mm nominal diameter was used as the polymer for catalytic conversion screening. The MPW was composed of about 31% LDPE, 25% HDPE, 19% PP, 12% PS, and 13% PET by weight, which is representative of the plastic composition in municipal solid waste streams. For non-catalytic tests, silicon carbide (SiC) was mixed with the MPW as a microwave absorber. For catalytic tests, different Fe-based catalysts were used: 50% $Fe/Al_2O_3$, FeAlOx-5, magnetite, 50% Fe/MgO, 50% Fe/ZSM-5, and iron powder.

The conversion tests were carried out in an h-field 2.45 GHz microwave reactor supplied by Malachite technologies.

Example 2. General Method

Before each test, a sample of MPW and SiC and/or catalyst was loaded into a quartz reactor tube, which was placed at the center of the microwave applicator. The sample temperature was measured by an infrared pyrometer through a viewport on the size of the waveguide applicator, which detects the temperature of the sample surface just inside the quartz tube. The temperature setpoint was controlled by PID. In a typical test, after purging the reactor with $N_2$ (g), the microwave generator was turned on and the sample was heated under continuous flow of $N_2$ (300 SCCM). Volatiles exiting the reactor flowed through a filter and cold trapped to condense the tars, while the non-condensable gases were analyzed by micro-gas chromatography (micro-GC) and mass spectroscopy (MS) for compositional analysis. The test duration was varied as each test was run until produced gases were no longer detected in the MS and $N_2$ (g) concentration returned to 100%. At the end of the test, the spent sample and tars were weighed to quantify the char and tar yields. "Char" is the solid material remaining after light gases (e.g., coal gas) and tar have been driven out or released from a carbonaceous material during the initial stage of the reaction and "tar" is the liquid form of the complex hydrocarbons produced, along with the primary gaseous product, during the conversion reaction.

Example 3

Non-catalytic and catalytic conversion tests were carried out in the HPMWR according to the experimental conditions outlined below in Table 1. For non-catalytic tests with SiC and catalytic tests, the SiC or catalyst was added to the MPW in a 3:1 MPW/catalyst ratio. For catalytic tests, each of the catalysts reached the process temperature without addition of SiC. The microwave susceptibility of these catalysts may be attributed to the high Fe loading of these catalysts (50% Fe by weight, greater for magnetite and Fe powder).

Due to the high temperature, the plastic was converted to hydrogen, hydrocarbons, and carbon products.

TABLE 1

Experimental Conditions

| Run # | Solid Sample | Amount (g) | Gas | Gas Flow Rate (SCCM) | Temp (° C.) | Power (W) | Time (min) |
|---|---|---|---|---|---|---|---|
| 1 | MPW + SiC | 6 + 2 | Ar | 150 | 550 | 500 | 10 |
| 2 | MPW + SiC | 6 + 2 | Ar | 150 | 700 | 500 | 10 |
| 3 | MPW + SiC | 6 + 2 | Ar | 150 | 850 | 500 | 10 |
| 4 | MPW + 50% $FeAl_2O_3$ | 6 + 2 | Ar | 150 | 700 | 500 | 10 |
| 5 | MPW + $FeAlO_x$ | 6 + 2 | Ar | 150 | 700 | 500 | 10 |
| 6 | MPW + Magnetite | 6 + 2 | Ar | 150 | 700 | 500 | 10 |
| 7 | MPW + FeMgO | 6 + 2 | Ar | 150 | 700 | 500 | 10 |
| 8 | MPW + FeZSM5 | 6 + 2 | Ar | 150 | 700 | 500 | 10 |
| 9 | MPW + Fe powder | 6 + 2 | Ar | 150 | 700 | 500 | 10 |
| 10* | MPW + SiC\|$FeAlO_x$ stacked bed | 6 + 2 \| 2 | Ar | 150 | 700 | 500 | 10 |
| 11** | MPW + FeAlOx 700C with alumina | 6 + 2 + 2 | Ar | 150 | 700 | 500 | 10 |

*Stacked bed tests were run with two beds within the same reactor: (1) MPW (mixed plastic waste) mixed with SiC on top, (2) catalyst bed below.
**Alumina was mixed in with the MPW and FeAlOx in the same bed.

The alumina served as a porous bed filler material to prevent the MPW from melting below the center of the reactor. Each tested catalyst was assessed for its ability to convert the MPW to hydrogen. The results are shown in FIGS. 5-7.

Figure 5:
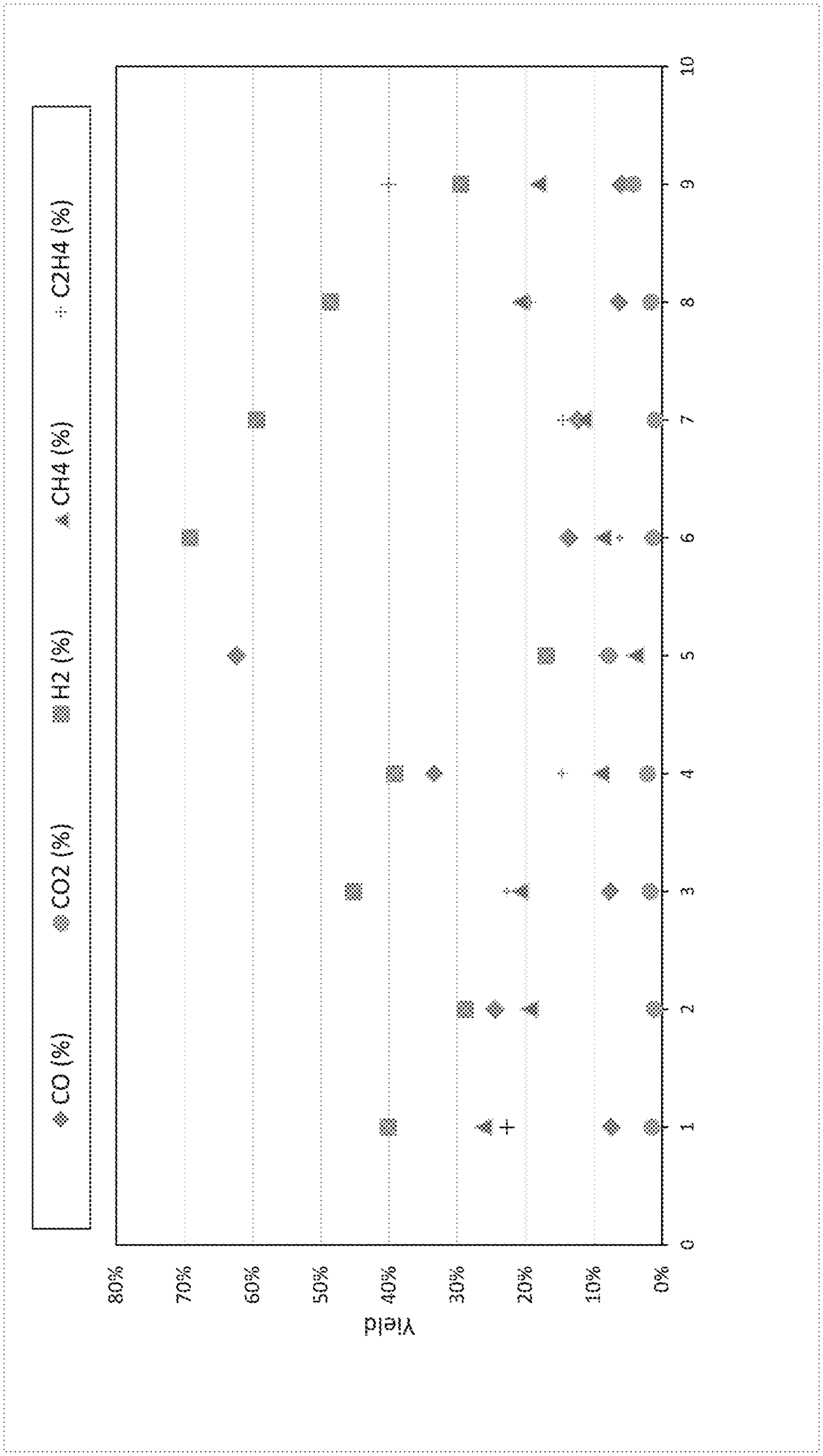
FIG. 5 shows an assessment of different catalysts for converting mixed plastic waste to hydrogen. The data measured include the percent yield of carbon monoxide (CO), carbon dioxide ($CO_2$), hydrogen ($H_2$), methane ($CH_4$) and ethylene ($C_2H_4$) for each tested catalyst.

FIG. 5 shows an assessment during the conversion reaction in terms of the percent yield of hydrogen, liquid hydrocarbons, carbon monoxide (CO) and carbon dioxide ($CO_2$) that were measured. FIG. 5 shows that, of all the tested catalysts, magnetite (6) produced the highest yield of hydrogen (about 70%) with the lowest yield of liquid hydrocarbon (about 10%). $FeAlO_x$ (5) produced the lowest yield of hydrogen (less than 20%) and a yield of about 5% liquid hydrocarbon.

FIG. 5 also shows that magnetite (6) produced the least amount of CO, $CO_2$ and $CH_4$ byproduct gases, indicating that magnetite is a very active catalyst under these reaction conditions to produce hydrogen at a maximum yield from plastics.

Figure 6:
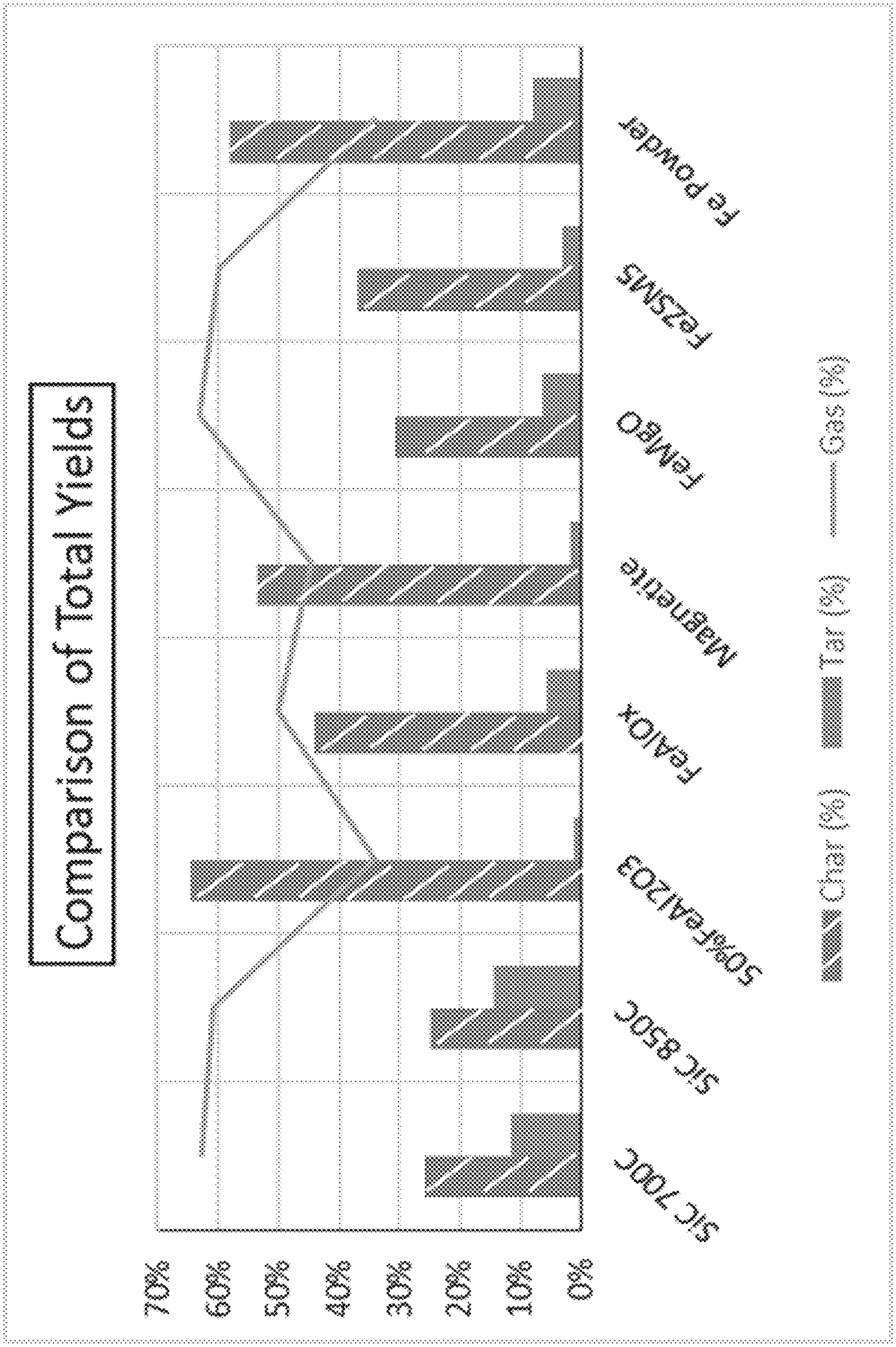
FIG. 6 shows an assessment of different catalysts for converting mixed plastic waste to hydrogen. The data measure include the total yields of char, tar, and gas for each tested catalyst.
Figure 7:
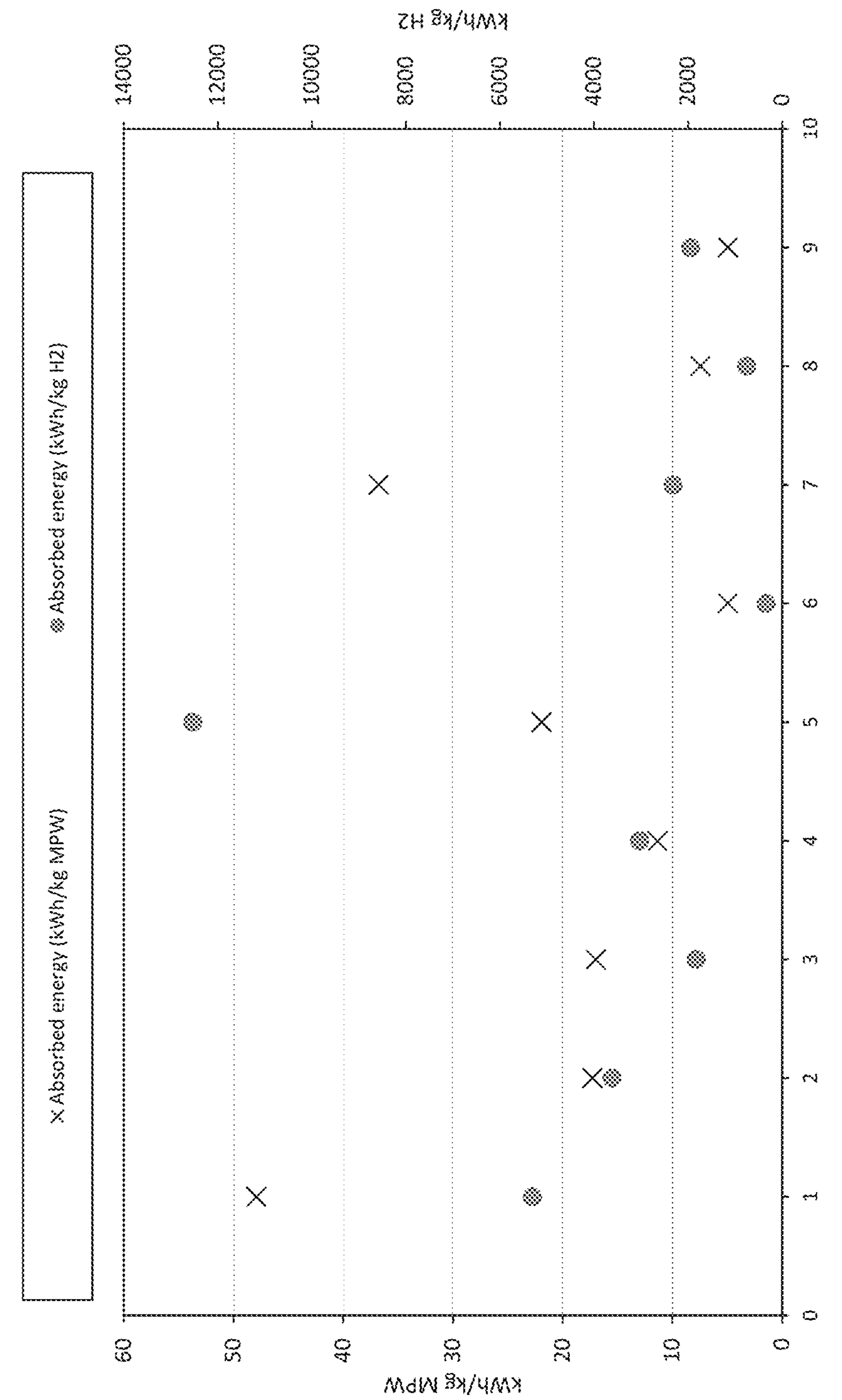
FIG. 7 shows an assessment of different catalysts for converting mixed plastic waste to hydrogen. The data measure include the absorbed energy utilization for each tested catalyst.

FIG. 6 shows an assessment during the conversion in terms of yields of char, tar, and gas for the catalysts SiC (700° C.), SiC (850° C.), 50% $FeA_{l2}O_3$, FeAlOx, magnetite, FeMgO, FeXSM5 and Fe powder. As shown in FIG. 6, Fe-based catalysts created the maximum amount of gas products, while minimizing tar creation. This, in turn, minimizes the costs in separation units, as higher gas production makes it easier to separate gas from solid and liquid residue (such as char and tar).

The amount of char produced was higher with magnetite as compared to the designer catalysts FeAlOx, Fe/MgO, $Fe/Al_2O_3$ and FeMgOx. This indicates carbon formation and higher deconstruction of the plastic.

FIG. 7 shows an assessment of the test catalysts listed in Table 1 during the conversion reaction in terms of absorbed energy per kg of MPW being used (x) and absorbed energy per kg of produced hydrogen (·). FIG. 7 shows that magnetite (6) used a minimal amount of energy for the reaction as compared to designer catalysts $Fe/Al_2O_3$ (4), FeAlOx (5), and Fe/MgO (7). This result suggests that the system consumes less energy when magnetite is used as the catalyst under microwave heating. The reduction in energy consumption seen with magnetite further reduces the costs associated with converting plastic to hydrogen.

It will be apparent to those in the art that specific embodiments of the disclosed subject matter may be directed to one or more of the above- and below-indicated embodiments in any combination.

While the invention has been disclosed in some detail by way of illustration and example for purposes of clarity of understanding, it is apparent to those in the art that various changes may be made and equivalents may be substituted without departing from the true spirit and scope of the invention. Therefore, the description should not be construed as limiting the scope of the invention.

All references, publications, patents, and patent applications disclosed herein are hereby incorporated by reference in their entirety.

What is claimed is:

1. A method for producing hydrogen comprising:

feeding a catalyst to a reactor;

feeding a plastic to the reactor, wherein the plastic is in solid particle form having a particle size within a range of about 1 mm to about 10 mm;

forming a fluidized bed within the reactor by feeding a gas to the reactor; and using microwave heating to heat the catalyst to a first temperature in a range from about 500° C. to about 2000° C.

to produce hydrogen.

2. The method of claim 1, wherein a microwave is applied at a frequency in a range of about 100 MHz to about 8 GHz to conduct the microwave heating.

3. The method of claim 1, wherein the microwave heating is applied continuously.

4. The method of claim 1, wherein the plastic is processed for a time in a range of 30 seconds to 10 minutes.

5. The method of claim 1, wherein the plastic is selected from the group consisting of polypropylene (PP), polycarbonate (PC), polystyrene (PS), polyethylene (PE), polyvinyl chloride (PVC), acrylonitrile-butadiene-styrene (ABS), polyethylene terephthalate (PET), nylon, and polyamide, and combinations thereof.

6. The method of claim 1, wherein the plastic is mixed plastic waste.

7. The method of claim 1, wherein the catalyst comprises an oxide of a metal selected from the group consisting of Ni, Co, Fe, Cu, Ce, Zr, Al, Si, Mg, Mn, Ti, V, Cr, Zr, Nb, and W, and combinations thereof.

8. The method of claim 1, wherein the catalyst comprises magnetite.

9. The method of claim 1, wherein the gas comprises at least one of a nitrogen, an argon, or combinations thereof.

10. The method of claim 1, further comprising feeding a porous media to the reactor.

11. The method of claim 10, wherein the porous media comprises a material selected from the group consisting of silica, alumina, zeolite, dolomite, and combinations thereof.

12. The method of claim 1, further comprising removing the hydrogen from the reactor.

13. The method of claim 1, wherein the gas comprises a hydrocarbon.

14. The method of claim 1, wherein the gas comprises a carbon dioxide.

15. The method of claim 1, wherein the catalyst is fed to the reactor via a first inlet.

16. The method of claim 1, wherein the plastic is fed to the reactor via a second inlet.

17. The method of claim 1, wherein the reactor is a cylindrical reactor.

18. The method of claim 17, wherein the gas is fed to the reactor through a distributor plate, and the distributor plate is a plate extending across a circular cross-section of the reactor, having a plurality of apertures configured to allow the gas to pass therethrough.

19. The method of claim 12, wherein the hydrogen is removed via a mixed effluent stream, the mixed effluent stream further comprising a solid carbon product and a hydrocarbon.

20. The method of claim 19, further comprising separating the hydrogen, the solid carbon product, and the hydrocarbon in the mixed effluent stream.

* * * * *